United States Patent Office 3,740,228
Patented June 19, 1973

3,740,228
LIGHT SENSITIVE PHOTOGRAPHIC MATERIAL
Hans Ohlschlager, Cologne, and Wolfgang Himmelmann, Opladen, Germany, assignors to Agfa-Gevaert Aktiengesellschaft, Leverkusen, Germany
No Drawing. Filed Feb. 22, 1971, Ser. No. 117,759
Claims priority, application Germany, Feb. 28, 1970, P 20 09 498.8
Int. Cl. G03c 1/84
U.S. Cl. 96—84 A                     2 Claims

ABSTRACT OF THE DISCLOSURE

Antihalation and filter dyes can advantageously be mordanted in photographic layers by means of mordanting polymer compounds which are condensation products of aminoguanidine and homo or copolymers of styrene derivatives containing keto groups.

---

This invention relates to a light sensitive photographic material comprising at least one silver halide emulsion layer which contains basic mordants for acid dyes especially in filter or antihalation layers.

Colored layers which can be decolorized in the course of development are frequently used in photographic materials. Thus it is usual to provide colored gelatin layers on the rear surface of roll films and flat films. These layers are intended not only to reduce the tendency of the film to roll up but also to absorb as completely as possible the rays of light which have not been absorbed by the emulsion layers on exposure, in order to prevent the formation of a reflection halo. Further improvement can be obtained by arranging the colored layer not on the rear surface of the support but directly underneath the lowermost emulsion layer so that back reflection from the film support is also prevented. In some cases, it is also necessary to coat the emulsion layer with a layer of dye in order to prevent to be exposed to unwanted radiation.

Filter layers are especially important in multilayered color photographic materials, e.g. yellow filter layers are arranged underneath a blue sensitive layer in order that the underlying layers, which have been sensitized to green or red light but have an intrinsic sensitivity to blue light, may be protected against the blue light. It is also known to improve the sharpness and reproduction of green in the region of intense exposure to light by arranging a filter layer containing a dye which absorbs green light between a green sensitized layer and a red sensitized layer situated under the green sensitized layer.

The dyes used in antihalation or filter layers must fulfil many conditions. Thus, for example, they must have good absorption properties and must be able to be bleached completely and irreversibly in the usual photographic baths. Furthermore, they should be readily soluble or dispersible in order that they may be able to be used in sufficiently high concentrations in the layers, but they must be fixed in their particular layer in such a manner that they cannot diffuse into adjacent emulsion layers. The resistance to diffusion is also required for the dyes in the layer which is arranged on the rear surface of the support, because this layer is also liable to come into close contact with the emulsion layer, e.g. when films are rolled up or when flat films lie above one another. The resistance to diffusion of the dyes must be ensured even under extreme conditions such as elevated temperature and moisture.

For the purpose of introducing suitable dyes into the layer in a diffusion-fast form, it has already been proposed to add guanidines, polymers which contain amino groups and similar basic compounds to the gelatin solutions of the dyes, or to fix the dyes by introducing longer hydrocarbon radicals into the dye molecule. These methods, however, in most cases reduce the solubility of the dyes and thus render more difficult the incorporation of these dyes into the layers, or in some cases the ability of the layers to be decolorized is seriously impaired or, as in the case where long chained quaternary ammonium salts are used as mordants for acid dyes, an excessive fog is produced in the adjacent emulsion layers.

In U.S. patent specification 2,882,156, condensation products of polyvinyl alkyl ketone with aminoguanidines are described as polymeric mordants for acid dyes. These polymeric mordants, however, are not satisfactory in all respects, their most serious disadvantages including the high viscosity of their mixtures with aqueous gelatin solutions and the relatively strong intrinsic color of the aqueous solution.

It is therefore the object of the invention to provide mordants for dyes containing at least one acid group for use in photographic layers, especially in antihalation and filter layers of photographic materials, which mordants do not have the disadvantage mentioned above, and layers colored with the aid of these mordants, which satisfy the requirements of photographic practice as regards resistance to diffusion, their ability to be removed by washing and their effect on adjacent layers.

It has now been found that basic polymer compounds which are excellent mordants for acid dyes in photographic layers are obtained by reacting aminoguanidine with polymeric styrene derivatives which contain keto groups.

The invention thus relates to a light sensitive photographic material comprising at least one silver halide emulsion layer and at least one water-permeable hydrophilic colloidal layer which material contains an acid dye and a basic mordant for the dye. The material is characterized in that the mordant used is a condensation product of aminoguanidine and a homopolymer or a copolymer of styrene derivatives which contain keto groups, such as vinylacetophenone, vinylpropiophenone or vinylbutyrophenone. The benzene rings of the styrene derivatives may be further substituted, e.g. with alkyl groups preferably having up to 5 C atoms, for example methyl, ethyl, propyl or isopropyl, or halogen atoms such as chlorine or bromine.

The polymer to be reacted with aminoguanidine may contain up to 50 mols percent of comonomers such as styrene, methylstyrene, vinyl acetate, butadiene, isobutylene, vinylpyridine or vinylpyrrolidone in addition to the styrene derivatives which contain keto groups.

The basic polymer compounds according to the invention are characterised by recurrent structural units of Formula I:

(I)
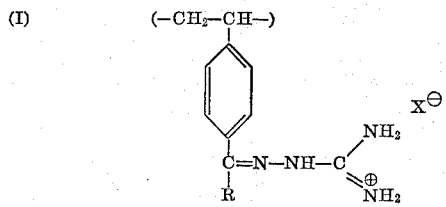

wherein

R=an alkyl radical having preferably up to 3 carbon atoms, for example methyl, ethyl, propyl or isopropyl; and $X^\ominus$=the anion of an acid, preferably an organic acid, e.g. an aliphatic carboxylic acid or sulphonic acid having up to 4 carbon atoms, such as formic acid, acetic acid, propionic acid, butyric acid, glycollic acid or lactic acid.

To prepare the basic polymer compounds according to the invention, styrene homopolymers or copolymers which do not contain keto groups and which have a molecular weight of between 10,000 and 200,000 are first reacted with the corresponding carboxylic acid anhydrides or carboxylic acid chlorides in the presence of anhydrous aluminum chloride. This reaction has already been described in the literature (J. A. Blancette, J. D. Cotman, J. Org. Chem. 23, 1117 (1958); W. O. Kenyon, G. P. Wangh, J. Polymer, Sci. 32, 83 (1958). This reaction yields the corresponding polymer compounds which have recurrent structural units of Formula II:

(II)

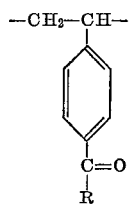

wherein R has the meaning indicated above.

These acyl derivatives are then reacted with one to five times their quantity of aminoguanidine salt, preferably aminoguanidine bicarbonate, in the presence of acetic acid and another organic solvent, preferably dioxane, chloroform or dimethylformamide, to yield the guanylhydrazones. The reaction temperature may be varied within wide limits, preferably between 50° C. and 120° C. This depends on the solvent mixture used in each case.

This condensation reaction generally does not proceed quantitatively, even if the aminoguanidine salt is used in excess. The basic polymer compounds according to the invention therefore still contain recurrent structural units of Formula II in addition to those of Formula I.

The basic polymer compounds are soluble in water with organic acids, in most cases undergoing reversible sol-gel conversion in aqueous solution at concentrations of about 4%, and they can easily be mixed with gelatin.

The compounds according to the invention always contain low molecular weight constituents which cannot be completely removed by dialysis. Photographically satisfactory mordants are obtained by mixing the reaction product with gelatin and digesting the mixture with water for 8 to 10 hours after solidification.

The preparation of some of the polymer compounds according to the invention will now be described in detail.

POLYMER COMPOUND 1

26 g. of polystyrene having a molecular weight of 180,000 are dissolved in 900 ml. of anhydrous tetrachloroethane, and 140 g. of anhydrous aluminum chloride are carefully added. A solution of 51 g. of acetic acid anhydried in 200 ml. of tetrachloroethane is then added dropwise in the course of 10 minutes with vigorous stirring. The mixture is then stirred at room temperature (approximately 20° C.) for 24 hours with exclusion of water. It is then poured on ice and the hydrophobic layer is separated off. It is concentrated under vacuum to a volume of 150 ml. and the compound is precipitated by the addition of methanol. The precipitate is dissolved in chloroform and the solution is filtered and reprecipitated with alcohol. After trituration with fresh ethanol and drying, 18 g. of polyvinylacetophenone (a) having an oxygen content of 10.1% are obtained.

(b) Reaction with aminoguanidine to yield the corresponding guanylhydrazone 14.6 g. of Compound a are dissolved in 112 ml. of dioxane and 48 ml. of glacial acetic acid. 32 g. of aminoguanidine bicarbonate are introduced with vigorous stirring at 90 to 1000° C. on a steam bath. The reaction mixture is then stirred for 15 minutes at 90° C. and thereafter treated with zinc granules after the addition of 54 ml. of water and 53 ml. of glacial acetic acid. The reaction mixture is then heated on a steam bath for 1½ hours and filtered. The guanyl hydrazone (polymer Compound 1) is precipitated by pouring the mixture into an aqueous sodium hydroxide solution and is then separated by suction filtration. It is dissolved with water which has been acidified with acetic acid and is then mixed with gelatin. The gel, after being broken up into small pieces, is then digested with distilled water for 4 to 8 hours.

Yield (before mixing with gelatin): 19 g.; nitrogen content 16.4%.

This guanylhydrazone may be assumed on the basis of its nitrogen value to have the following formula (composition):

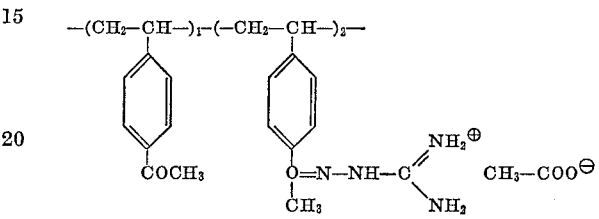

Polymer compound 2

(a) Polyvinylacetophenone is prepared as described under 1, a polystyrene having a molecular weight of 10,000 being used in this case.

(b) The reaction with aminoguanidine bicarbonate using the method described under 1b yields a guanylhydrazone which has a nitrogen content of 17%.

Probable composition:

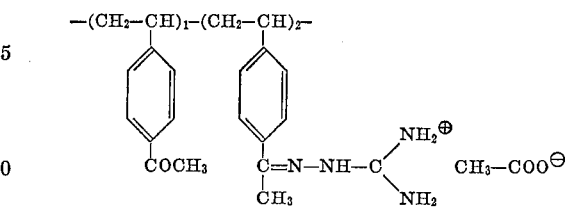

POLYMER COMPOUND 3 (GUANYLHYDRAZONE OF POLYVINYLPROPIOPHENONE)

(a)

Polyvinyl propionphenone is prepared by the same method as compound 1a except that 65 g. of propionic acid anhydrides are used instead of acetic anhydride.

Yield: 29.5 g., oxygen content: 10%.

(b) Reaction with aminoguanidine 16 g. of compound 3a are dissolved in 112 ml. of dioxane and 48 ml. of glacial acetic acid, 32.8 g. of aminoguanidine bicarbonate are added with stirring. The temperature is increase to 90–100° C. The mixture is then stirred for a further 15 minutes and filtered. The clear solution is precipitated in water with an excess of sodium hydroxide. The reaction product is isolated, washed and redissolved in a mixture of water and alcohol with the addition of acetic acid and the solution is dialysed against distilled water for 48 hours.

Yield: 17.2 g., nitrogen content: 13.3%.

According to analysis, the product may be assumed to have the following composition:

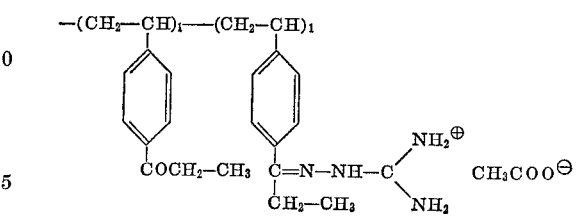

POLYMER COMPOUND 4 (GUANYL HYDRAZONE OF POLYVINLYBUTYROPHENONE)

Polyvinylbutyrophenone is prepared and reacted with aminoguanidine bicarbonate in a similar manner.
Nitrogen content: 5.6%.
Probable composition:

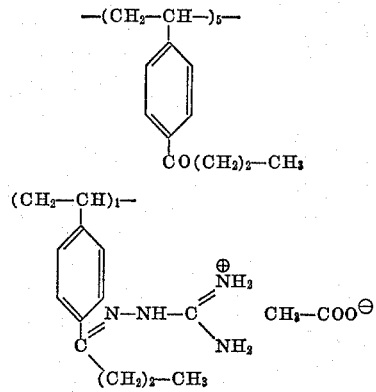

POLYMER COMPOUND 5

The methyl ketone of a copolymer of 9 parts by weight of styrene and 1 part by weight of 2-methylstyrene (molecular weight 10,000) is prepared by acylating the said copolymer as described for compound 1. On the basis of oxygen analysis, this methyl ketone copolymer may be assumed to have the following composition:

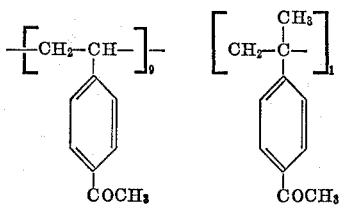

A guanylhydrazone having a nitrogen content of 17.3% is obtained by reacting the production with aminoguanidine. The reaction is not complete. The formula cannot be indicated even approximately since the reaction velocities of the two vinyl acetophenones are not known.

POLYMER COMPOUND 6

A copolymer of the following formula is prepared by copolymerisation:

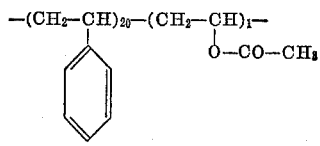

Oxygen content: 1.2%.
This copolymer is converted into the following compound by acylation as described in Example 1:

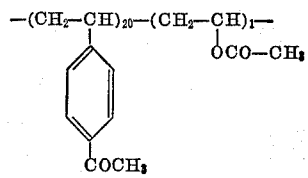

Oxygen content: 10.5%.

After the reaction with aminoguanidine, a guanylhydrazone having a nitrogen content of 12.3% is isolated.

Dyes of various constitutions containing one or more acid groups such as sulfonic acid or carboxyl groups may be incorporated diffusion-fast into hydrophilic layers of binders by means of the mordants according to the invention. The dyes for which these mordants would mainly be used are dyes froh the classes of oxonoles, styryl dyes, triphenylmethane dyes, merocyanines, azo dyes, etc. The following are examples of suitable dyes:

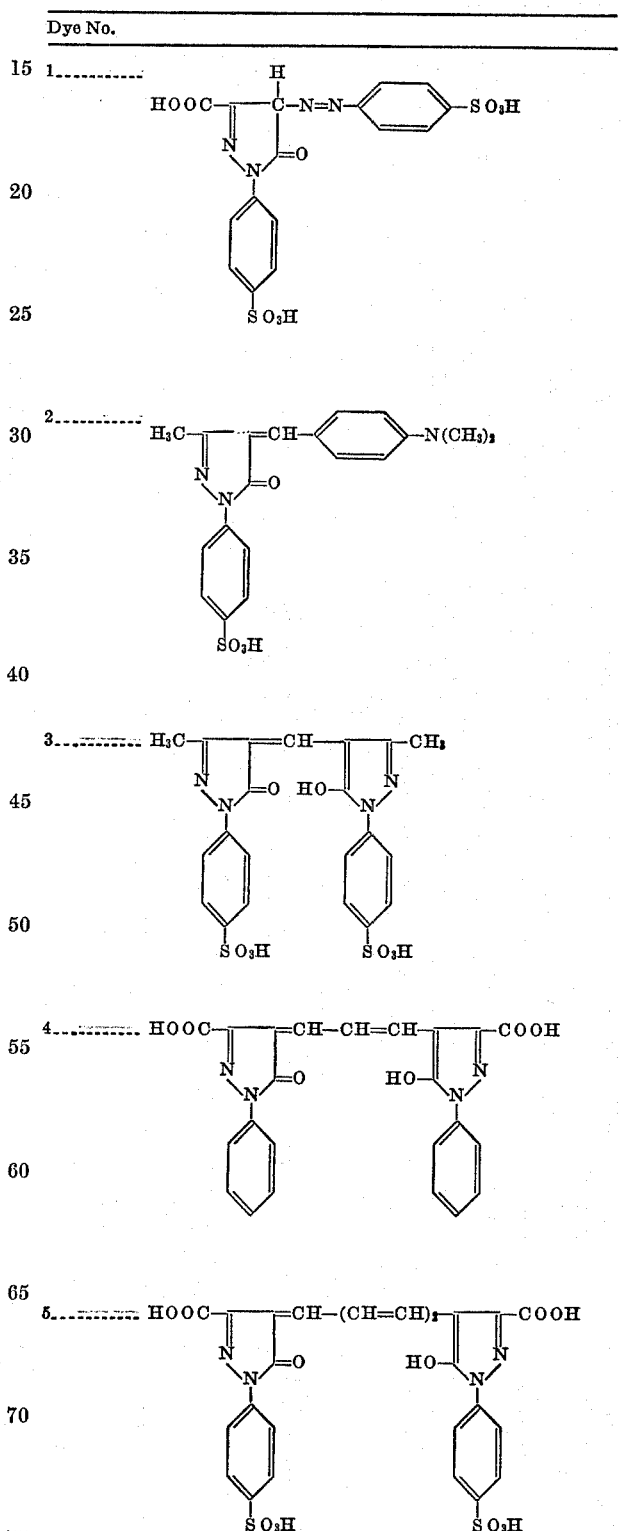

| Dye No. | |
|---|---|
| 6 | 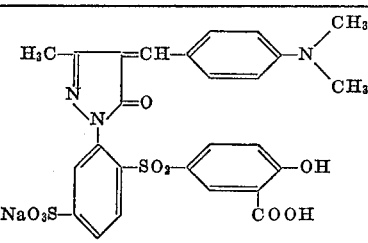 |
| 7 | 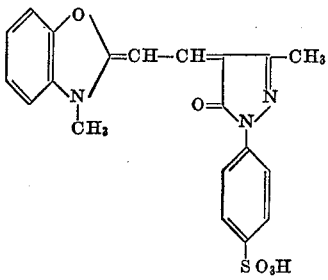 |
| 8 | 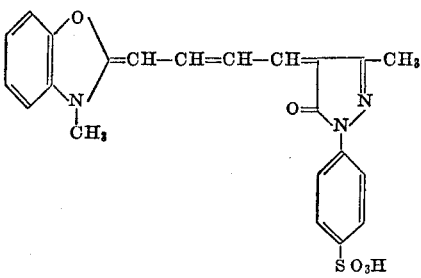 |
| 9 | 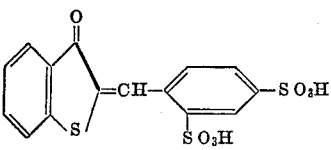 |
| 10 | 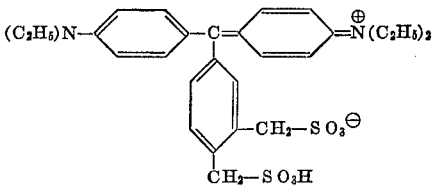 |
| 11 | 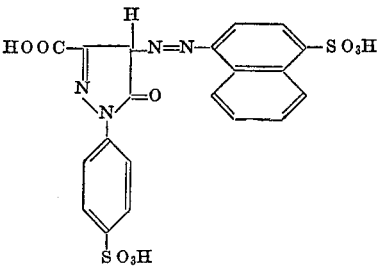 |
| 12 | 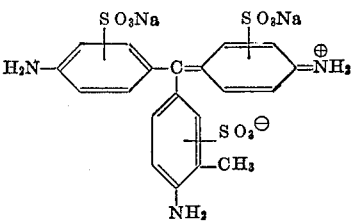 |

When the cationic mordants are mixed with an aqueous solution of dyes which contain acid groups, a complex which is insoluble at all pH values is generally formed. Homogeneous mixing without flocculation can be achieved only if certain process steps are carried out. One of the following methods, for example, may be employed:

(1) The mordant is cast in a gelatin layer and the dye is used in an adjacent layer. The dye diffuses into the mordant layer in the course of casting and is fixed there. This process is known as such and has already been described in U.S. patent specification 1,954,294 but in the said patent specification a low molecular weight mordant is generally used.

(2) The mordant is dissolved in a gelatin solution. When the mixture solidifies, it is shredded. The gelatin shreds are covered with an aqueous solution of the dye and briefly stirred. The gelatin shreds are melted with the addition of alcohols.

A particular embodiment of this invention will now be described. The water-soluble dye is dissolved in a 10% aqueous gelatin solution and about 10% of ethanol (based on the solution) are added. Into this mixture a solution of the mordant in a mixture of 1 part by volume of water and 1 part by volume of alcohol is poured with stirring. The homogeneous mixture is solidified, shredded and washed in water for 4 hours. The gelatin shreds can then be melted without flocculation and result in a perfect layer after casting.

The layers colored by the process according to the invention may be used as antihalation or filter layers for any conventional photographic materials which contain one or more light sensitive silver halide emulsion layers. The colored layers may be arranged either on the rear surface of the support or between the support and a light sensitive layer or between two emulsion layers. Also it is possible to incorporate the acid dyes by means of the inventive mordants into one or more silver halide emulsion layers in order to prevent within the emulsion layer diffuse radiation by reflection at the silver halide grains and hands to improve the sharpness.

Generally the colored layers are decolorized during the conventional processing steps for example in an alkaline developing bath so that no additional treatment is necessary. For example the mordanting effect can be removed in an alkaline bath and the dyes due to the solubilizing groups present in the molecule become soluble and are washed out of the layer. If the silver halide emulsion layers contain dyes which can react with color-forming developer oxidation products to form other dyes having a better solubility decoloration is sometimes promoted by color-forming development. On the other hand it has been found that the inventive mordants are also useful in color-photographic materials in mordanting colored and colorless color-forming couplers having at least one acid group and at least one group rendering the molecule diffusion fast in the emulsion layer. It has been found that the sharpness of the images is largely increased by this embodiment. Such a material after processing contains imagewise an acid dye mordanted by uniformly distributed mordanting polymer of the invention.

The mordants according to the invention may also be used in the various dye diffusion transfer processes, for example in the technicolor-process or in other processes, wherein use is made of diffusible acid dyes, which can be transferred imagewise, for the purpose of fixing the dyes which diffuse out of the light sensitive layers in the image receiving layer.

The material used as support for the colored layers may be any of the usual, preferably transparent supports such as glass or foils of synthetic materials, for example cellulose esters or polycarbonates, especially polyethylene terephthalate. If the mordants are used in the image receiving layers, the support material need not be transparent and may consist of paper, for example.

The most suitable material for use as binder for the colored layers is gelatin but this may be partly or completely replaced by other hydrophilic binders such as polyvinyl alcohol (polyacrylamide) or cellulose derivatives in general.

The antihalation and filter layers may be hardened in the usual manner, for example with formaldehyde or halo-substituted aldehydes which carry a carboxyl group, such as mucobromic acid, diketones, methansulfonic acid esters or dialdehydes.

The antihalation and filter layers are produced in the usual manner by casting the gelatin solution of the dye and mordant on a photographic material. A wetting agent such as saponin may be added to ensure more even casting. The pH of the casting solution is adjusted by the usual methods to a value which is comparable to that of the emulsion used. The proportions in which the dye, mordant, binder, hardener and wetting agent are used in relation to each other may vary within wide limits and depend on the particular purpose for which the materials are intended. The methods employed for determining the optimum ratios are well known in the art and require no explanation here.

Suitable emulsions for the light sensitive layers of the material according to the invention are emulsions of silver halides such as silver chloride, silver bromide or mixtures thereof, optionally with a small silver iodide content of up to 10 mols percent, in one of the usual binders such as protein, in particular gelatin, polyvinyl alcohol, polyvinyl pyrrolidone, cellulose derivatives and polyacrylamise.

These emulsions may be sensitized to certain ranges of the spectrum. Suitable spectral sensitizers are e.g. the usual monomethine or polymethine dyes such as acid or basic cyanines, hemicyanines, streptocyanines, merocyanines, hemioxonoles, oxonoles, azacyanines or styryl dyes, as well as methine dyes which have three or more nuclei, such as rhodacyanines or neocyanines. Sensitizers of this type have been described in the work by F. M. Hamer "The Cyanine Dyes and Related Compounds" (Interscience Publishers, 1964).

If the materials according to the invention are to be used for the production of colored images, the emulsion layers may in addition contain dyes or other dye forming substances, e.g. color-forming couplers which react with the oxidation product of color-forming developers which has been formed imagewise to yield dyes (a comprehensive account may be found, for example, in the article "Farbkuppler" by W. Pelz in "Mitteilungen aus den Forschungslaboratorien der Agfa Leverkusen, Munich," Volume III, page 111), and they may also contain dyes which can be bleached, for example azo dyes or their precursors, e.g. those described in British patent specification 1,173,295, or dyes used for the dye diffusion transfer process, e.g. as described in German patent specifications 1,196,075 and 1,095,115 German Offenlegungsschrift 1,930,215 or in Dutch patent specication 68, 10480.

The preparation of photographic materials having antihalation and filter layers colored in accordance with the invention will now be described in the following examples.

EXAMPLE 1

An aqueous solution of pH 6.5 which contains 4.0 g. of gelatine, 0.15 g. of saponin, 0.3 g. of dye 6 and 0.9 g. of polymer compound 1 per 100 ml. of solution was applied as a layer of 2.5µ in tthickness on a film support of triacetyl cellulose (Sample A). The same solution but without containing a polymer mordant was prepared as comparison sample and cast in the same manner (Sample B). Both samples were coated with a silver iodobromide emulsion which had not been sensitized, and treated with a developer of the following composition:

|   | G. |
|---|---|
| p-Methylaminophenol | 5 |
| Hydroquinone | 6 |
| Sodium sulphite sicc. | 40 |
| Potassium carbonate | 40 |
| Potassium bromide | 2 |
| Water up to 1000 ml. | |

The two samples were washed in water after fixing. The dye layers are completely and irreversibly decolorized in both cases.

Microscopic examination of the cross-section of the above materials showed that the dye was completely retained in the filter layer in Sample A whereas in Sample B a considerable amount of the dye had penetrated the adjacent emulsion layer.

EXAMPLE 2

An aqueous solution of pH 6.5 containing 4.0 g. of gelatine, 0.15 g. of saponin, 0.3 g. of dye 9, 0.2 g. of dye 10, 0.2 g. of dye 12 and 1.3 g. of polymer compound 2 per 100 ml. of solution was applied as a layer of 3µ in thickness on two samples of a triacetyl cellulose foil which was covered with an adhesive layer. A panchromatically sensitized silver iodobromide emulsion was then applied to both samples, in one case to the side which did not carry the colored layer, the layer of dye serving as antihalation layer (Sample A). In the second sample, the light sensitive layer was applied to the layer of dye, the layer of dye being therefore in this case situated between the support and the emulsion layer (Sample B).

Both samples were developed, fixed and washed as described in Example 1, and the colored layers were decolorized without difficulty in both cases. Sensitometric comparison showed that the same sensitivity was obtained in both cases, showing that the dye had resisted diffusion into the emulsion layer in Sample B as well.

EXAMPLE 3

A 5% aqueous gelatin solution containing 7 g. of dye 1 per kg. was applied as a layer of 2.5µ in thickness on a triacetylcellulose foil which was covered with an adhesive layer. On this layer of colored gelatin solution, a 4% aqueous gelatin solution containing 13 g. of polymer compound 1 per kg. was applied in a thickness of 3µ. The layers were coated with a silver iodobromide emulsion which contained per kg. 45 g. of silver bromide, 5 g. of silver iodide, 95 g. of gelatin and 10 g. of a yellow coupler of the following formula:

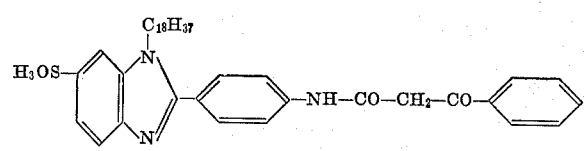

The yellow filter layer was completely decolorized after conventional colour-forming development and the photographic properties of the emulsion layer were not impaired by the yellow filter layer.

I claim:

1. A light sensitive photographic material containing a silver halide emulsion and having at least one water-permeable hydrophylic colloidal layer which contains in said emulsion or in said layer an acid dye and a basic mordant for the dye comprising a homopolymer or copolymer of a styrene derivative, the benzene ring of which being substituted with the guanylhydrazone of an alkyl keto group and wherein the benzene ring may be further substituted with alkyl groups having up to 5 C-atoms. wherein 2. A light seisitive photographic material having a silver halide emulsion and at least one water permeable hydrophilic colloidal layer which material contains in said emulsion or in said hydrophilic layer an acid dye and a basic mordant for the dye, wherein the mordant used is a polymer compound having recurrent structural units of the following formula:
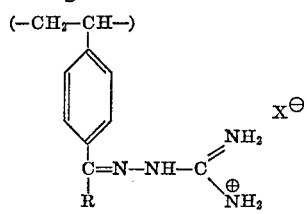
R = an alkyl radical having up to 3 C atoms and
X⁻ = the anion of an acid.
References Cited
UNITED STATES PATENTS
| | | | |
|---|---|---|---|
| 2,945,006 | 1960 | Minsk | 260—65 |
| 3,625,691 | 12/1971 | Ohyama | 96—84 A |
| 2,945,006 | 1960 | Minsk | 260—65 |
RONALD H. SMITH, Primary Examiner
U.S. Cl. X.R.
96—57, 114

UNITED STATES PATENT OFFICE
CERTIFICATE OF CORRECTION

Patent No. 3,740,228     Dated  June 19, 1973

Inventor(s) Hans Ohlschlager et al

It is certified that error appears in the above-identified patent and that said Letters Patent are hereby corrected as shown below:

Column 4, line 20, the guanylhydrazone group in the formula should read as follows:

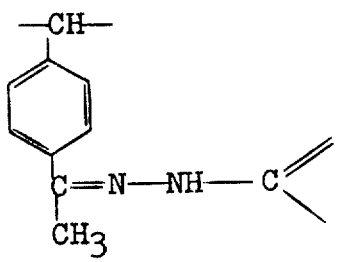

Column 4, line 40, the guanylhydrazone group in the formula should read as follows:

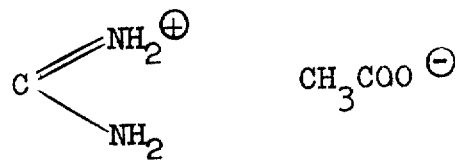

Column 4, line 75, the guanylhydrazone group in the formula should read as follows:

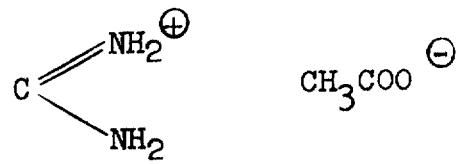

Column 10, in claim 2, line 1, "seisitive" should read -- sensitive -- .

Signed and sealed this 27th day of November 1973.

(SEAL)
Attest:

EDWARD M. FLETCHER, JR.
Attesting Officer

RENE D. TEGTMEYER
Acting Commissioner of Patents